United States Patent Office 3,210,198
Patented Oct. 5, 1965

3,210,198
PROCESS FOR PREPARING A WHIPPABLE COMPOSITION
Harold M. Keller, St. Paul, Minn., assignor to General Mills, Inc., a corporation of Delaware
No Drawing. Filed June 4, 1962, Ser. No. 199,616
9 Claims. (Cl. 99—139)

The present invention relates to a process for preparing a whippable composition. More particularly, it relates to a process for preparing a composition which can be whipped to provide a dessert topping or icing for cakes and the like.

Powdered compositions for use in preparing whipped toppings are known. Such materials offer the advantage of ease of handling due to their free flowing character and freedom from spoilage on storage for long periods of time due primarily to their low moisture content. However, most of these compositions have not enjoyed much commercial success because they are not readily whipped and perform in an inconsistent manner. For example a paste emulsion of skim milk solids, fat, sucrose, and a mixture of mono- and diglycerides, while readily whipped when added to whole milk, has been found to be virtually unusable when dried. In the dried form an excessive whipping period is required even when a mechanical beater is employed. Some improvements in whippability apparently can be obtained by substituting a water soluble protein such as sodium caseinate for the milk solids, but the overrun on whipping is usually low, the texture heavy and pasty, and the aftertaste or mouth feel greasy.

It has recently been proposed to prepare whippable compositions by drying an emulsion of a fat and a partial ester of an edible glycol and a higher saturated fatty acid in a matrix of hydrophilic encapsulating solids selected from proteinaceous materials and mixtures of proteinaceous and carbohydrate materials. While such products function satisfactorily as to whippability, their preparation involves several steps including blending of the ingredients, preparation of an emulsion and drying of the prepared emulsion by such methods as spray-drying. It would be highly desirable to be able to prepare whippable compositions without having to first emulsify the ingredients and then dry the resulting emulsion by spray-drying, for example.

Therefore, it is an object of the present invention to provide a simplified method of preparing whippable compositions.

Another object of the invention is to provide such a method which eliminates the necessity of forming and drying an emulsion of the ingredients.

These and other objects will become apparent from the following detailed discussion.

I have now discovered that whippable compositions can be prepared by subjecting a mixture of shortening, emulsifier, sugar and a proteinaceous material to simultaneous shearing and crushing forces. The compositions so prepared are easily and readily whipped to give toppings or icings having excellent volume, spreadability, texture and eating properties.

The shortening can be any of those commonly employed in food products. Thus, any combination of edible oils, semi-solid or solid fats can be employed. Such shortening materials can be partially or fully hydrogenated. Examples of suitable shortenings include: lard, modified lard, butter, margarine, and various animal and vegetable oils. Representative of the latter are coconut oil, palm kernel oil, cottonseed oil, peanut oil, olive oil, sunflower seed oil, sesame oil, corn oil, safflower oil, poppyseed oil, soybean oil and the like. Preferably, the shortening is an oil or a low melting fat.

An emulsifier is also used in the process of the present invention. Representative of such compounds are mono- and diglycerides of fat forming fatty acids, such as mono- and diolein, monostearin, and dipalmitin; polyoxyalkylene ethers of fatty esters of polyhydric alcohols, such as the polyoxyethylene ethers of sorbitan monostearate or the polyoxyethylene ethers of sorbitan distearate; mono- and diesters of glycols and fatty acids such as propylene glycol monostearate; and partial esters of carboxylic acids such as lactic, citric, and tartaric acids with the mono- and diglycerides of fatty acids, such as glyceryl lactopalmitate. The fatty acids used to prepare the above emulsifiers include those derived from beef tallow and castor, coconut, cottonseed, mustard seed, palm, peanut, rapeseed, rice bran, soybean, tall and marine oils. A preferred emulsifier is glyceryl lactopalmitate.

Suitable sugars for use in the invention include any of the commonly used granular sugars, including sucrose, dextrose, maltose, fructose, lactose and brown and invert sugars as well as mixtures of said sugars. Such sugars can also be used in powdered form. Corn syrup solids can be employed when it is desired to produce toppings having reduced sweetness.

A wide variety of proteinaceous materials can be employed. Representative thereof are non-fat milk solids, water soluble soy protein derivatives, egg albumen, gelatin and sodium caseinate. The protein stabilizes the topping or icing prepared from the whippable composition and is preferably sodium caseinate.

The whippable compositions prepared by my process can also contain other ingredients such as flavoring agents, dyes or colorants, lecithin or hydroxy lecithin, citric acid, vitamins, minerals and the like. Suitable flavoring agents include fruit flavors, chocolate, caramel, mint, butter, maple, spice, vanilla and the like. The lecithin compound is used to increase the volume of the topping or icing. Such compounds are preferably used in the form of a dry mix (40%) on non-fat milk solids. Citric acid also increases the volume of the toppings. Salts, vitamins and minerals can be included to increase the flavor and/or nutritional value of the toppings.

The amounts of the above-described ingredients can be varied over relatively wide limits. For example, the sugar is used in an amount sufficient to provide the desired sweetness level to the ultimate topping or icing. Likewise, the amount of the shortening will be sufficient to provide a stable topping which has good mouth feel but yet is not greasy. Also the emulsifier and proteinaceous material will be used in amounts sufficient to give good whipping properties to the whippable composition and to stabilize the topping, respectively. A preferred range of ingredients is as follows:

| Ingredients: | Percent by weight |
|---|---|
| Shortening | 5.0–15.0 |
| Emulsifier | 3.0–10.0 |
| Sugar | 45.0–85.0 |
| Proteinaceous material | 2.0–6.0 |
| Flavoring agents | 0.0–20.0 |
| Lecithin compound | 0.0–1.5 |
| Citric acid | 0.0–0.2 |
| Vitamins, Minerals | 0.0–5.0 |
| Dyes or colorants | 0.0–2.0 |

Especially good results are obtained when both the lecithin compound and citric acid are included in amounts of 0.2–1.5% and 0.05–0.2%, respectively.

As indicated previously, the above-described ingredients in the desired weight ratios are subjected to simultaneous shearing and crushing forces according to my process. Such shearing and crushing can be accomplished by the use of roller mills in which the adjacent rollers revolve at different speeds. The mills have at least two rollers, and preferably three or more rollers, which are revolving at different speeds. The ratios of roll speeds of adjacent rollers will generally be in the range of about 2:1 to 5:1. For a three roll mill, the preferred ratio is 1:3:5. The shearing and crushing on the described roller mills may be done by a single pass or by several passes, the number thereof being limited only by economics. Very satisfactory results are obtained by a single pass through said mills. The pressure of the rollers can be varied widely but is preferably in the range of about 200–400 p.s.i.

The ingredients are preferably blended and ground prior to being subjected to the simultaneous shearing and crushing forces. Thus for example, the sugar and emulsifier can be blended together and ground by conventional methods such as in a Fitz mill. The other ingredients can then be added, blended in a standard ribbon mixer and the complete mix passed through the differential roller mill. After the simultaneous shearing and crushing of the complete mix, the product may optionally be further processed to reduce the particle size thereof or break up flakes of mix formed in the rolling operation. Such processing can be accomplished on a cake mix finisher, for example.

The mixing or blending and simultaneous shearing and crushing steps are preferably carried out at ambient room temperatures. Where solid shortenings are used, it may be desirable to melt the same prior to the described step or steps.

The following examples serve to illustrate the present invention without, however, limiting the same thereto.

*Example I*

A white, vanilla flavored whippable composition was prepared from the following ingredients:

| Ingredients: | Percent by weight |
|---|---|
| Sucrose | 51.4 |
| Corn syrup solids | 30.0 |
| Margarine oil (lightly hydrogenated blend of soybean and cottonseed oils) | 9.0 |
| Glyceryl lactopalmitate | 5.0 |
| Sodium caseinate | 3.0 |
| Lecithin (40% by wt. on non-fat milk solids) | 0.8 |
| Vanilla | 0.4 |
| Salt | 0.3 |
| Citric acid | 0.1 |

The sucrose and glyceryl lactopalmitate were blended together and ground in a Fitz mill. The rest of the ingredients were added and blended well in a standard ribbon mixer. The complete mix was then passed through a 3 roll differential roller mill having a ratio of roll speeds of adjacent rollers of 1:3:5 (pressure about 230–250 p.s.i.). The mix was passed through said roller mill a second time. The resulting whippable composition consisted of an intimately blended composition of fine particle size.

Six ounces of the whippable composition were mixed with six ounces of water and whipped at high speed on a mechanical mixer. After about 2½–3½ minutes, the whipped topping reached a density of 0.36 to 0.45 g./cc. The finished topping was firm enough to stand in peaks and when spread on cake, provided a delicious icing which was very stable, did not dry out and which had excellent mouth feel and eating properties.

An equally delicious topping can be prepared by replacing the water with six ounces of milk.

*Examples II and III*

Whippable compositions were prepared from the following ingredients:

| Ingredients | Percent by weight | |
|---|---|---|
| | Example II | Example III |
| Sucrose | 69.4 | 63.4 |
| Margarine oil (See Example I) | 9.0 | 9.0 |
| Glyceryl lactopalmitate | 5.0 | 5.0 |
| Sodium caseinate | 3.0 | 3.0 |
| Cocoa | 12.0 | |
| Butterscotch flavor | | 9.0 |
| Caramel flavor | | 9.0 |
| Lecithin (40% on non-fat milk solids) | 0.8 | 0.8 |
| Vanilla | 0.4 | 0.4 |
| Salt | 0.3 | 0.3 |
| Citric acid | 0.1 | 0.1 |

The ingredients were blended and subjected to simultaneous shearing and crushing forces by the same procedure as set forth in Example I. The resulting whippable composition provided excellent chocolate and caramel flavored icings when six ounces of the respective compositions were blended and whipped with six ounces of water or milk.

The process of the present invention, as illustrated by the above examples, provides a simplified method for preparing highly suitable whippable compositions. Thus no emulsion need be formed and no spray drying step is needed. The whippable compositions so prepared can be used to prepare toppings or icings for a wide variety of products including cakes, pies, rolls, puddings and the like.

It is to be understood that the invention is not to be limited to the exact details of operation or the exact processes and compositions shown or described, as obvious modifications will be apparent to those skilled in the art and the invention is to be limited only by the scope of the appended claims.

The embodiments of the invention in which an exclusive property or privilege is claimed are defined as follows:

1. A method of making a dry whippable composition for use in the preparation of dessert toppings and icings which comprises subjecting a dry mixture consisting essentially of sugar, an emulsifier, shortening and a proteinaceous material selected from the group consisting of non-fat milk solids, water soluble soy protein derivatives, egg albumen, gelatin and sodium caseinate to simultaneous shearing and crushing forces, the amounts of the sugar, emulsifier, shortening and proteinaceous material being sufficient to provide a dry composition which can be readily whipped when mixed with an aqueous liquid selected from the group consisting of water and milk to yield a stable whipped product of desired sweetness.

2. The method of claim 1 wherein the mixture is intimately blended prior to being subjected to the simultaneous shearing and crushing forces.

3. The method of claim 1 wherein the whippable composition is further processed to reduce the particle size thereof.

4. The method of claim 1 wherein the mixture also contains at least one additive selected from the group consisting of flavoring agents, dyes, a lecithin compound, citric acid, vitamins, minerals and mixtures thereof.

5. The method of claim 1 wherein the emulsifier is glyceryl lactopalmitate.

6. The method of claim 1 wherein the shortening is selected from the group consisting of oils and low melting fats.

7. The method of claim 1 wherein the proteinaceous material is sodium caseinate.

8. The method of making a dry whippable composition for use in the preparation of dessert toppings and icings which comprises subjecting a dry homogeneous blend of 45 to 85 parts sugar, 5 to 15 parts shortening, 3 to 10 parts emulsifier, 2 to 6 parts proteinaceous material selected from the group consisting of non-fat milk solids, water soluble soy protein derivatives, egg albumen, gelatin and sodium caseinate, 0 to 20 parts flavoring agents, 0 to 1.5 parts lecithin compound, 0 to 0.2 parts citric acid and 0 to 2.0 parts dye to simultaneous shearing and crushing forces to provide a dry composition which can be readily whipped when mixed with an aqueous liquid selected from the group consisting of water and milk to yield a stable whipped product of desired sweetness.

9. The method of claim 8 wherein the emulsifier is glyceryl lactopalmitate and the proteinaceous material is sodium caseinate.

References Cited by the Examiner

UNITED STATES PATENTS

| | | | |
|---|---|---|---|
| 2,619,422 | 11/52 | Diamond | 99—139 |
| 2,846,314 | 8/58 | Aichele et al. | 99—139 |
| 2,874,053 | 2/59 | Mills | 99—94 |
| 2,913,342 | 11/59 | Cameron et al. | 99—139 X |
| 3,051,577 | 8/62 | Babayan et al. | 99—139 X |

A. LOUIS MONACELL, *Primary Examiner*.

BEATRICE H. STRIZAK, *Examiner*.